July 13, 1937.  F. L. SCOTT  2,086,682
PILOT BEARING FOR DRILL CUTTERS
Filed Feb. 29, 1936

Floyd L. Scott
INVENTOR

BY Jesse R. Stone
ATTORNEY

Patented July 13, 1937

2,086,682

UNITED STATES PATENT OFFICE 2,086,682

PILOT BEARING FOR DRILL CUTTERS

Floyd L. Scott, Houston, Tex., assignor to Hughes Tool Company, Houston, Tex., a corporation of Texas Application February 29, 1936, Serial No. 66,327

6 Claims. (Cl. 255—71)

My invention relates to cutter bearings upon well drills having cutters of the cone type. A well known form of well drill includes one or more cutters of generally conical shape adapted to be mounted upon a stub shaft and to surround and enclose one end of the said shaft.

It is an object of my invention to provide a bearing for the smaller end of the cutter pin which will be hard and wear-resisting.

It is a further object to place a wear resistant bearing upon the cutter shaft after heat treating said shaft. I aim to avoid the necessity of heating the shaft after it is formed and treated.

I also aim to provide a hard bearing surface for the cutter shaft which is easily and quickly applied in position.

Figure 1:
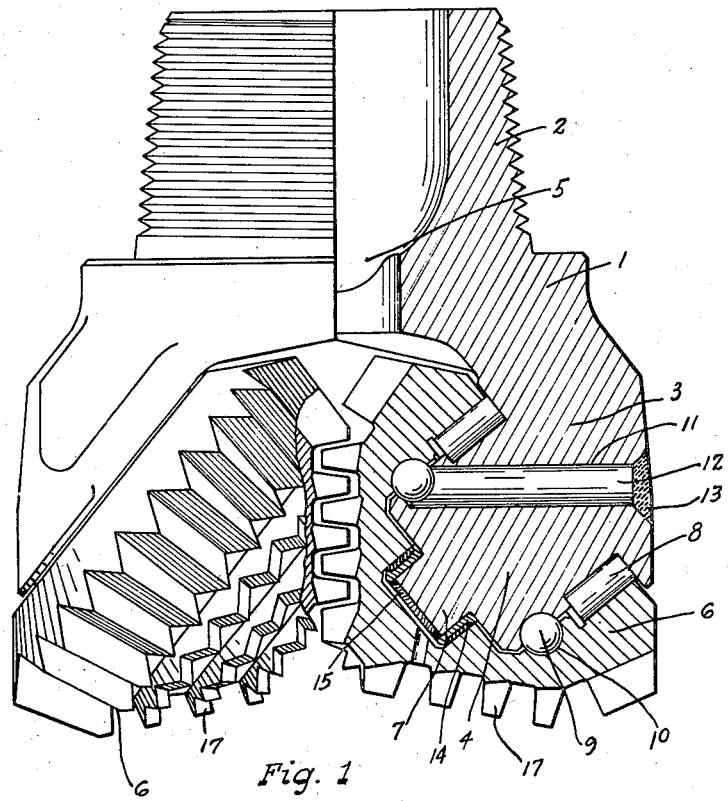

In the drawing herewith Fig. 1 is a side view partly in central longitudinal section illustrating the application of the invention.

Figure 2:
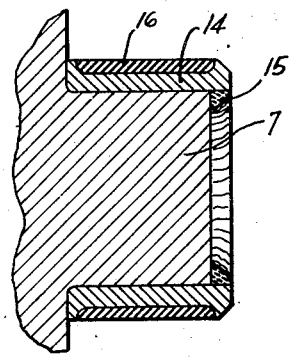

Fig. 2 is an enlarged sectional detail of the end of the cutter shaft with the invention applied thereto.

The cone bit illustrated is a common one. It has a head 1 with an upwardly tapered and threaded shank 2 for engagement with a drill collar. Two forwardly extending legs 3 are formed on the head and each leg has an integral inwardly and downwardly inclined cutter shaft 4 thereon. There is an axial channel through the head at 5 to conduct flushing fluid upon the cutters 6 mounted on shafts 4.

The shafts 4 are approximately cylindrical for the greater portion of their lengths, but have a short pilot end 7 thereon of smaller outer diameter than the main portion of the shaft. Raceways are formed in the shaft for a row of roller bearings 8 at the base of the shaft and for a row of balls 9 toward the forward end of the shaft 4. The row of balls 9 fit partly within a raceway 10 in the cutter head and thus act to lock the cutters on the shaft. Said balls are introduced into locking position in the raceway 10 through a bore 11 in the head. Said bore is then filled with a plug 12 held in place by a bond of welding material 13.

At the small end of the shaft I place a bushing 14 shown best in Fig. 2. Said bushing is in the form of a ring or collar of steel slightly longer than the pilot end 7 of the shaft so as to project beyond the end of the shaft, as shown. The bushing may thus be fixed in position by a bond of welding material 15.

On the outer periphery of the bushing is a layer 16 of hard material such as "stellite" or similar hard facing material. As will be seen the bushing has an annular recess to receive the hard material.

The cutters 6 are of the usual construction. They have cutting teeth 17 on their outer surfaces and the interior is formed to fit upon the shaft and bearings.

In rotating during use, the larger portion of the thrust is taken up by the roller and ball bearings. There is, however, a strong lateral thrust upon the forward end of the shaft. This is particularly strong when the other bearings become worn. My bearings 16 take up this lateral thrust. Because of the difference of material between the cutter and the had faced bushing the friction will be reduced. Wear will not be great and this bearing which is ordinarily subject to rapid deterioration will last as long as the cutter and maintain said cutter in proper operative position.

By placing the hard facing upon a bushing instead of directly upon the shaft, the bushing can be readily prepared and treated before it is fixed in position upon the shaft. The quality of the material both in the shaft itself and in the bushing can be regulated easily and cheaply.

What I claim as new is:

1. A cutter shaft, a cylindrical pilot end thereon of reduced diameter, a sleeve-shaped bushing on said end, a layer of relatively hard metal on the outer periphery of said bushing, and means to secure said bushing integrally on said shaft.

2. A cutter shaft, a cylindrical pilot end thereon of reduced diameter, a sleeve-shaped bushing on said end, a layer of relatively hard metal on the outer periphery of said bushing, said bushing being longer than said reduced end and projecting beyond the same, and means applicable within the projecting end of said bushing to secure said bushing on said shaft.

3. A cutter shaft, a cylindrical pilot end thereon of reduced diameter, a sleeve-shaped bushing on said end, a layer of relatively hard metal on the outer periphery of said bushing, said bushing being longer than said reduced end and projecting beyond the same, and means to secure said bushing on said shaft, including a bond of welding material along the projecting portion of said bushing.

4. A drill head, a downwardly and forwardly projecting cutter shaft thereon, said shaft being approximately cylindrical with a forward pilot end of reduced diameter, antifriction bearings on said shaft, a bushing on said pilot end projecting beyond the end thereof, a layer of hard facing material on said bushing, and a bond of welding material within the projecting portion of said bushing to retain said bushing on said shaft.

5. A drill head, an approximately cylindrical cutter shaft thereon, a forwardly projecting cylindrical thrust bearing of smaller diameter at the forward end of said shaft, a bushing on said bearing, a layer of hard facing metal on said bushing, a bond of welding material securing said bushing on said shaft, and a cutter enclosing said shaft and rotatable thereon.

6. A cutter shaft of heat treated steel and a projecting end of reduced diameter, a separately treated sleeve-shaped bushing on said reduced end shaped to be separately applied to said end by welding after said shaft has been treated, a layer of relatively hard material on said bushing and a bond of welding material to hold said bushing integrally with said shaft.

FLOYD L. SCOTT.